(12) United States Patent
Elgarhy

(10) Patent No.: US 7,648,928 B2
(45) Date of Patent: Jan. 19, 2010

(54) COMPOSITION AND METHOD FOR ENHANCING STAIN RESISTANCE AND PRODUCT OF ENHANCED STAIN RESISTANCE THEREFROM

(75) Inventor: Yassin Elgarhy, St-Eustache (CA)

(73) Assignee: Trichromatic Carpet Inc., St-Eustache, Québec (CA)

( * ) Notice: Subject to any disclaimer, the term of this patent is extended or adjusted under 35 U.S.C. 154(b) by 137 days.

(21) Appl. No.: 11/518,501

(22) Filed: Sep. 11, 2006

(65) Prior Publication Data

US 2008/0124992 A1   May 29, 2008

(51) Int. Cl.
*B32B 27/04* (2006.01)
*B05D 3/02* (2006.01)

(52) U.S. Cl. .............. 442/93; 427/389.9; 427/389; 427/393.4

(58) Field of Classification Search ............ 442/93, 442/160–163, 168; 427/389.9, 389, 393.4
See application file for complete search history.

(56) References Cited

U.S. PATENT DOCUMENTS

| | | | |
|---|---|---|---|
| 4,223,473 A | 9/1980 | Brown | |
| 4,501,591 A | 2/1985 | Ucci et al. | |
| 4,592,940 A | 6/1986 | Blyth et al. | |
| 4,680,212 A | 7/1987 | Blyth et al. | |
| 4,780,099 A | 10/1988 | Greshler et al. | |
| 4,822,373 A | 4/1989 | Olson et al. | |
| 4,841,090 A | 6/1989 | Patel | |
| 4,865,885 A | 9/1989 | Herlant et al. | |
| 4,937,123 A | 6/1990 | Chang et al. | |
| 5,098,774 A | 3/1992 | Chang | |
| 5,310,828 A * | 5/1994 | Williams et al. | 525/502 |
| 5,681,620 A * | 10/1997 | Elgarhy | 427/387 |
| 5,821,177 A * | 10/1998 | Elgarhy | 442/93 |
| 6,197,378 B1 | 3/2001 | Clark et al. | |
| 6,488,893 B1 | 12/2002 | Elgarhy et al. | |
| 6,814,881 B2 | 11/2004 | Elgarhy | |

\* cited by examiner

*Primary Examiner*—Lynda Salvatore
(74) *Attorney, Agent, or Firm*—Ogilvy Renault LLP

(57) ABSTRACT

A fibrous polyamide or wool substrate having resistance to staining by acid colorants comprises, a fibrous polyamide or wool substrate having applied thereto a sulfonated aromatic condensation resin, said resin being a condensation product of a sulfonated dihydroxydiphenyl sulfone, a dihydroxydiphenyl sulfone, a sulfonated naphthalene and an aldehyde; or a sulfonated dihydroxydiphenyl sulfone, a sulfonated naphthalene and an aldehyde; optionally a methacrylic acid polymer is also applied thereto as well as a fluorochemical; an aqueous formulation of the resin is also provided which formulation may include the methacrylic acid polymer as well as the fluorochemical Additionally there may be employed a salt to enhance exhaustion of components onto the substrate; a method of treating a fibrous polyamide or wool substrate employing the formulation is also provided.

18 Claims, No Drawings

COMPOSITION AND METHOD FOR ENHANCING STAIN RESISTANCE AND PRODUCT OF ENHANCED STAIN RESISTANCE THEREFROM

FIELD OF THE INVENTION

This invention relates to a fibrous polyamide or wool substrate having durable resistance to staining by acid colorants and to a composition and method of rendering a fibrous polyamide or wool substrate durably resistant to staining by acid colorants.

BRIEF DESCRIPTION OF PRIOR ART

Fibrous polyamide substrates, such as nylon carpeting and similar wool substrates are susceptible to staining by both naturally occurring and commercial acid colorants found in many common foods and beverages. The demand for reduced staining from such acid colorants has by and large been met by treatment with compositions comprising sulfonated naphthol or sulfonated phenol-formaldehyde condensation products as disclosed for example in the following patents: U.S. Pat. No. 4,501,591 Ucci and Blyth; U.S. Pat. No. 4,592,940 Blyth and Ucci; U.S. Pat. No. 4,680,212 Blyth and Ucci; U.S. Pat. No. 4,780,099 Greshler, Malone and Zinnato; U.S. Pat. No. 4,865,885 Herlant and Al; or by treatment with composition comprising sulfonated novolak resins together with polymethacrylic acid as disclosed in U.S. Pat. No. 4,822,373 Olson, Chang and Muggli.

U.S. Pat. No. 6,488,893 discussed reducing polyamide fibers staining by treating the fibers with condensation product of sulfonated naphthalene sulphonic acid, and aldehyde and a dihydroxydiphenyl sulfone together with a methacrylic acid polymer.

U.S. Pat. No. 6,814,881 discussed providing anti-stain protection by treating polyamide fibers with a condensation product of a sulfonated dihydroxydiphenyl sulfone dihydroxydiphenyl sulfone and an aldehyde together with a methacrylic acid polymer.

The use of polymers and copolymers of methacrylic acid of low weight average molecular weight and low number average molecular weight is described in U.S. Pat. No. 4,937,123 Chang, Olson and Muggli.

The initial stain resistance properties imparted to polyamide or wool substrates, such as carpeting, that have been treated using the above mentioned compositions degenerate, significantly with each wet cleaning the substrate receives. Improved stain resistance after wet cleaning can be achieved by increasing the amount of the sulfonated aromatic formaldehyde condensation products, in the stain resist product or by increasing the amount of stain-resist product initially applied to the substrate, however, this generally leads to discoloration caused by yellowing of the substrate initially and further discoloration upon exposure to oxides of nitrogen and/or light.

Stain-resist products currently available in the market place are generally based on dihydroxydiphenyl sulfone and phenol sulphonic acid condensed with an aldehyde in acid or alkaline media, or dihydroxydiphenyl sulfone and naphthalene sulphonic acid condensed with aldehyde.

It is generally known that increasing the ratio of the dihydroxydiphenyl sulfone to the phenol sulphonic acid or naphthalene sulphonic acid increases the stain resistance properties of the resin but subsequently causes a higher degree of yellowing or discoloration initially and further discoloration upon exposure to oxides of nitrogen and/or light.

Conversely it is also evident that when the ratio of phenol sulphonic acid or naphthalene sulphonic acid to dihydroxydiphenyl sulfone increases the result is less discoloration, but lower stain-resist properties.

The addition of a methacrylic resin in the form of methacrylic polymers and/or copolymers to the previously mentioned condensation products (novolak resin) as disclosed in U.S. Pat. No. 4,223,473 (Olson, Chang and Muggli) allows the use of a novolak resin in smaller quantities with larger quantities of the methacrylic resin. With this combination of novolak resin and methacrylic resin, a major improvement in the light fastness or less discoloration is achieved due to the dramatically reduced percentage of novolak resin in the product mentioned above, which is adjusted to obtain a desired low level of discoloration while maintaining an acceptable level of durability to wash. The high level of initial stain resistance is supposedly maintained by the novolak resin, the methacrylic resin having largely been removed during the wet cleaning process.

U.S. Pat. No. 6,197,378 discusses the addition of salts to fluorochemical bath or fluorochemical both to improve exhaustion.

U.S. Pat. No. 5,098,774 discusses the manufacturing of condensation product of sulfonated dihydroxydiphenyl sulfone with formaldehyde followed by neutralization with magnesium oxide to produce novolak salt water soluble resin, this novolak salt resin can be used alone or with fluorochemicals to achieve good exhaustion of stain resist and water and oil repellency at the same time.

SUMMARY OF THE INVENTION

It is an object of this invention to provide fibrous polyamide or wool substrates having durable resistance to staining by acid colorants.

It is further object of this invention to provide a method of rendering a fibrous polyamide or wool substrate durably resistant to staining by acid colorants.

It is still a further object of this invention to provide an aqueous formulation for providing resistance to staining by acid colorants in a fibrous polyamide or wool substrate.

In accordance with one aspect of the invention there is provided a fibrous polyamide or wool substrate having resistance to staining by acid colorants comprising: a fibrous polyamide or wool substrate having applied there to a sulfonated aromatic condensation resin, said resin being a condensation product of a sulfonated dihydroxydiphenyl sulfone, a dihydroxydiphenyl sulfone, a sulfonated naphthalene and an aldehyde; or a sulfonated dihydroxydiphenyl sulfone, a sulfonated naphthalene and an aldehyde.

In accordance with another aspect of the invention there is provided a method of imparting stain resistance to acid colorants, to a fibrous polyamide or wool substrate comprising: contacting said fibrous polyamide or wool substrate with a sulfonated aromatic condensation resin in an aqueous vehicle, said resin being a condensation product of a sulfonated dihydroxydiphenyl sulfone, a dihydroxydiphenyl sulfone, a sulfonated naphthalene and an aldehyde; or a sulfonated dihydroxydiphenyl sulfone, a sulfonated naphthalene and an aldehyde.

The condensation product can be applied alone or in combination with a methacrylic acid polymer and/or a fluorochemical.

In accordance with another aspect of the invention there is provided an aqueous formulation for providing resistance to staining by acid colorants in a fibrous polyamide or wool substrate comprising in an aqueous vehicle a sulfonated aromatic condensation resin, said resin being a condensation products of a sulfonated dihydroxydiphenyl sulfone, a dihydroxydiphenyl sulfone, a sulfonated naphthalene and an aldehyde; or a sulfonated dihydroxydiphenyl sulfone, a sulfonated naphthalene and an aldehyde; optionally with a methacrylic acid polymer of high weight average molecular weight and high number average molecular weight and/or optionally an ionic or non-ionic fluorochemical.

DETAILED DESCRIPTION OF THE INVENTION

Condensation Resin

The invention employs a sulfonated aromatic condensation resin.

The condensation resin is a condensation product of a sulfonated dihydroxydiphenyl sulfone, a sulfonated naphthalene and an aldehyde; or a sulfonated dihydroxydiphenyl sulfone, a dihydroxydiphenyl sulfone a sulfonated naphthalene and an aldehyde.

The aldehyde is suitably formaldehyde or a lower alkyl aldehyde in which the lower alkyl moiety has 1 to 6 preferably 1 to 4 carbon atoms.

The dihydroxydiphenyl sulfone may in particular be 4,4 dihydroxydiphenyl sulfone; and similarly the sulfonated dihydroxydiphenyl sulfone may, in particular be sulfonated 4,4 dihydroxydiphenyl sulfone.

The sulfonation takes the form of sulphonic acid groups which increase the solubility of the condensation products.

The degree of sulfonation of the sulfonated naphthalene and the sulfonated dihydroxydiphenyl sulfone is suitably between 30 to 200%, preferably 80 to 130%.

The above condensation products may suitably be bleached or semi-bleached to remove or reduce color, which causes the yellow staining of nylon fibers, by techniques known in the art. By way of example the condensate may be bleached by addition of 0.1 to 4% by weight, sodium formaldehyde sulfoxylate or zinc formaldehyde sulfoxylate for a period of 20 to 90 minutes at a temperature below 100° C. This typically reduces color by 20 to 80% and prevents further discoloration. The bleaching or partial stripping of color is preferably carried out at pH lower than 7 when zinc formaldehyde sulfoxylate is employed and higher than 7 when sodium formaldehyde sulfoxylate is employed at a temperature of 50° C. or higher. The reference to bleaching, stripping or partially removing color herein refers to removal of the part of the color in the condensate which causes the yellow staining of the fibers, bleaching, stripping or partial removal of color results in the condensate becoming lighter in color.

The degree of bleaching or stripping depends upon the condensate and whether it is condensed in acid or alkaline media; and also depends on the stripping agent employed, for example whether it is sodium or zinc, formaldehyde sulfoxylate and the bleaching or stripping conditions, for example pH or temperature.

The time and the temperature are important factors and the percentage of stripping of the color varies according to the stripping conditions between 20 to 80%.

After the bleaching or stripping, even if the color is still dark, it is observed that yellowing of the fibers is much less.

The amounts of the sulfonated aromatic condensation resin on the polyamide substrate is dependent on the process employed for the deposition, as is well understood by persons in the art, and thus persons in the art will well understand the concentrations required in the aqueous formulation based on the application technique and method parameters employed.

The aqueous formulation is applied to the fibrous substrate by conventional procedures, for example, the substrate may be immersed in a bath of the aqueous formulation, or the formulation may be exhausted onto the substrate by foam system or spray or applied in one step with fluorochemical by exhaust, foam or spray system. Suitably the treated substrate is rinsed with water and dried. The resin in the dried substrate may optionally be cured at an elevated temperature. The thus treated substrate retains the deposited resins.

Suitably the resins are applied to the polyamide fiber substrate in an aqueous vehicle at a pH of 1 to 10, preferably 1 to 7, more preferably 1.5 to 3.

Methacrylic Polymers

Methacrylic acid polymers referred to herein contemplates homopolymers as well as copolymers with one or more comonomers.

The methacrylic acid is optionally employed in conjunction with the sulfonated condensation resin.

Completely soluble acrylic and methacrylic homopolymers and copolymers do not have durability to wet cleaning, so that their stain resist effect diminishes with wet cleaning; whereas completely insoluble acrylic resins have very little stain resist effect on polyamide fibers.

The methacrylic acid polymer, is suitably a homopolymer of methacrylic acid or a copolymer of methacrylic acid and at least one comonomer, for example, ethyl acrylate, 2-ethylhexyl methacrylate, ethyl methacrylate, methyl methacrylate, butyl methacrylate isobutyl methacrylate acrylic acid, butylacrylates ethyl acrylate or a mixture of more than one of these monomers.

The methacrylic acid polymer suitably has a high weight average molecular weight (MW) of at least 50,000 to 500,000 and preferably 150,000 to 250,000 preferably over 200,000 and a high number average molecular weight (MN) of at least 25,000 typically 25,000 to 100,000 and preferably 25,000 to 80,000 and more preferably 30,000 to 60,000.

The methacrylic acid polymer, when employed together with semi-bleached to bleached sulfonated aromatic condensation products are applied to the polyamide fiber or wool substrate in an aqueous vehicle.

The amount of suitable methacrylic polymers and the semi-bleached to bleached aromatic condensation products of this invention, deposited from the aqueous formulation on the polyamide fiber or wool substrate is dependent on the process employed for the deposition; as is well understood by persons in the art, and thus persons in the art will well understand the concentration required in the aqueous formulation, based on the application technique and method parameters employed.

The aqueous formulation is applied to the substrate by conventional procedures for example, the substrate may be immersed in a bath, or the aqueous formulation may be exhausted onto the substrate by foam system or spray or applied in one step with fluorochemical by exhaust, foam, spray or padding. Suitably, the treated substrate is rinsed with water and dried.

The treated substrate retains the deposited condensation product and methacrylic polymers, on the fibers.

In a preferred embodiment an anionic, or non-ionic fluorochemical is also applied to the substrate. The fluorochemical can be applied from a single bath containing the other components to be deposited or may be deposited from a separate bath to provide water and oil repellency and soil resist.

A salt may be employed to enhance the exhaustion of the sulfonated resin on the substrate.

Suitable salts are mono, di- or polyvalent metal salts and ammonium salts, for example, alkali metal salts, alkaline earth metal salts and aluminum salts, for example aluminum formate, aluminum sulphate, sodium sulphate, magnesium sulphate, zinc sulphate, copper sulphate, ferrous sulphate, magnesium chloride, calcium chloride, sodium chloride, potassium chloride and ammonium chloride.

An acid may also be employed when the treatment is carried out at an acid pH, suitable acids include sulfamic acid, sulphuric acid hydrochloric acid, citric acid, phosphoric acid, urea sulfate, urea hydrochloride, urea phosphate, formic acid oxalic acid and acetic acid. The urea sulfate, urea hydrochloride and urea phosphate act as a source of the acid, i.e. sulphuric acid, hydrochloric acid and phosphoric acid.

An aqueous formulation of the methacrylic acid polymer and the sulfonated aromatic condensation resin for treating a polyamide substrate, typically contains an amount of the methacrylic acid polymer to deposit on the polyamide substrate of Nylon 66 at least 0.1% by weight and at least 0.3% by weight, on Nylon 6.

The sulfonated aromatic condensation resin of this invention is typically employed in the formulation in an amount to deposit at least 0.03% by weight, on Nylon 66 substrate and at least 0.1% by weight on Nylon 6 substrate, based on the weight of the substrate.

In a particular embodiment there is deposited on Nylon 66, the sulfonated aromatic condensation resins of the invention in an amount of at least 0.1% based on the weight of the substrate, together with at least 0.2% based on the weight of the substrate of the methacrylic acid polymer.

1. In a particular embodiment the condensation product is neutralized, by way of example the neutralization may be with caustic soda, potassium hydroxide, or aqueous ammonia to form a condensated aromatic neutralized resin, water soluble at pH 1-10preferably, 3-7more preferably 3-5. In a further particular embodiment the neutralization may be with a metal oxide or hydroxide, for example oxides or hydroxides of magnesium, calcium, zinc or other metal oxides or hydroxides. Particular examples of metal oxides or hydroxides are aluminum hydroxide, alumina trihydrate, magnesium oxide, barium oxide, barium hydroxide, calcium oxide, zinc oxide or other heavy alkaline metal hydroxides or oxides. In the case of neutralized condensation product, the exhaust bath may contain the neutralized condensation product, the methacrylic polymer, and the fluorochemical and the addition of a salt may not be required.

In another particular embodiment there is deposited on Nylon 6, the sulfonated aromatic condensation resin in an amount of at least 0.2% together with at least 0.4% of the methacrylic acid polymer. The sulfonated aromatic condensation resin of this invention can be made as follow:

Into a clean glassline reactor equipped with mechanical stirrer to produce efficient agitation, the following were as charged, amounts being indicated in parts by weight:

7.5 parts of acetic acid anhydride
15 parts 4.4 dihydroxydiphenyl sulfone
7.5 parts sulphuric acid (99% concentration)
The reactor was heated to 100° C. and the stirring is continued for 6 hours at 100° C.
This reaction produces 4.4 sulfonated dihydroxydiphenyl sulfone
The degree of sulfonation of the above product is between 100 and 200%
Once the reaction is completed, the reaction product is cooled down to 80° C.

Then, additional ingredients are added as follows, amounts being indicated in parts by weight:
4.5 parts sulfonated naphthalene
5.25 parts dihydroxydiphenyl sulfone
7.5 parts water
8 parts formaldehyde (37% concentration in water)
After this addition stirring continued for 30 minutes at 80° C. Then the temperature was increased to 100 to 105° C. and the stirring continued for 6 hours at 100 to 105° C.

Then, the reacted product was cooled to 70° C. and neutralized with magnesium oxide while distilling the acetic acid to pH between 1-8, preferably 3-5 then bleached with sodium formaldehyde sulfoxylate or zinc formaldehyde sulfoxylate for 30 minutes at 70° C.

The amounts of the sulfonated dihydroxydiphenyl sulfone, the dihydroxydiphenyl sulfone, the sulfonated naphthalene and the formaldehyde may be adjusted to provide sulfonated condensation resins of different solubilities and different molecular weight while ensuring that the resin product is effective to block the dye sites of the polyamide and provides good durability.

For comparison with the resin of the invention, there was considered a mixture of resins, the first resin of the mixture being a condensation resin of sulfonated naphthalene, 4,4-dihydroxydiphenlyl sulfone and formaldehyde and the second resin of the mixture being a condensation resin of sulfonated 4,4-dihydroxydiphenlyl sulfone and formaldehyde. The individual resins which in admixture are employed in examples # 5 and # 14 below are made as follows:

First resin, the naphthalene condensate; in a glass lined reactor there was charged, with amounts indicated in parts by weight: 15 parts of refined naphthalene and 16 parts of sulphuric acid (concentration 99%) the resulting charge was mixed for 6 hrs at 160° C. The resulting product was a sulphonated naplithalene. The temperature of the reaction mixture was adjusted to 80° C., then there was added 10 parts of 4,4-dihydroxydiphenyl sulfone, 4.5 parts of water, 8.6 parts of formaldehyde (concentration 37%) and the temperature was increased to 115° C. with mixing for 6 hrs, whereafter the mix was cooled to 80° C. and there was added: 29.9 parts of water and 16 parts of ammonia The second resin was made as follows, with amounts indicated in parts by weight: 10 parts acetic acid anhydride, 20 parts 4,4-dihydroxydiphenyl sulfone and 10 parts sulphuric acid, the above mix was heated to 100° C. and mixed for 6 hrs, then cooled down to 80° C., then there was added: 7.7 parts water and 5.8 parts formaldehyde (concentration 37%); the resulting mixture was mixed for 6 hrs, then cooled down to 80° C., then there was added: 7.7 parts of water and 5.8 parts formaldehyde (concentration 37%); the resulting mixture was mixed for 6 hrs at 100-105° C. then neutralized with caustic soda and the product was adjusted to 100 parts with water.

Test Methods

In the test procedures and examples described below all percentages are by weight unless otherwise indicated, the molecular weight (MW) is the weight average molecular weight, and the molecular weight (MW) is the weight average molecular weight, and the molecular weight (MN) is the number average molecular weight.

Initial Stain Resistance ("IS")

A 5"×5" sample of the substrate to be tested is placed on a flat, non-absorbent surface. A two inches diameter ring is placed on the sample and 20 ml of staining solution is poured into the ring and worked into the substrate. The ring is removed and the sample is left undisturbed for 16 hours at ambient temperature. The staining solution is prepared by dissolving 0.6 grams of Acid Red Dye No. 40, the sample is rinsed with cool tap water and dried.

The stain resistance of the sample is visually rated by assessing the amount of color remaining in the stained area by comparison with the unstained portion. The sample is rated on a scale from 1 to 10 is excellent stain resistance and 1 is poor stain resistance categorized as follows:

10. Excellent stain resistance
09. Good stain resistance
08. Acceptable stain resistance
07. Poor stain resistance
06. Unacceptable staining
05. Unacceptable staining
04. Unacceptable staining
03. Unacceptable staining
02. Unacceptable staining
01. Unacceptable staining After Wet Cleaning Stain Resistance ("WS")

The sample to be tested is first immersed in a detergent solution containing 15 grams of Duponol Waqe (Trade Mark of E.I. DuPont de Nemours a surface active agent based on lauryl sulfate) per liter of water at a pH of 10 and at 20° C. for 15 minutes. The sample is removed from the detergent solution and rinsed thoroughly with cool tap water and dried. The staining solution is then applied and evaluated as set out in the initial stain resistance procedure.

Initial Yellowing (Discoloration) Evaluation ("ID")

In the examples a graduated scale from 1 to 5 was used to evaluate yellowing where 5 represents no yellowing 4 represents acceptable yellowing and 3 or less represents unacceptable yellowing.

Discoloration Upon Exposure to Light ("LD")

In the examples a graduated scale from 1 to 5 was used to evaluate discoloration upon exposure to light where 5 represents no discoloration 4 represents acceptable discoloration and 3 or less represents unacceptable discoloration. Exposure to light was carried out according to AATCC test method 16E with an exposure time of 40 standard hours.

Water and oil repellency test method start with the lowest numbered test liquid. Carefully place one drop of the test liquid in several location on the surface, repeat with higher number liquid until the highest number reached does not wet the surface in 30 second for oil and 10 second for water.

| Water (liquid) test | | |
|---|---|---|
| Water rating number | Isopropanol | Water |
| 1 | 2 | 98 |
| 2 | 5 | 95 |
| 3 | 10 | 90 |
| 4 | 20 | 80 |
| 5 | 30 | 70 |
| 6 | 40 | 60 |

| Oil (liquid) test | |
|---|---|
| Oil rating number | Composition |
| 1 | Laydol (mineral oil) |
| 2 | 65/35 Kydol/N - Hexadelane |
| 3 | N - Nexadelane |
| 4 | N - Tetradelane |
| 5 | N - Dodelane |
| 6 | N - Delane |

The sulfonated aromatic condensation product alone and with the methacrylic polymer were tested as follows:

Test on Nylon 66

The treatment bath was adjusted to pH 1.8 by Bartex C-4 (Trade-mark for buffering system from Trichromatic Carpet under U.S. Pat. No. 5,821,177)

In each case Nylon 66 substrate was immersed in the stain resist bath to obtain a pick up of about 350% on the weight of the substrate, then steamed for 3 minutes, followed by light rinse and dried to be ready for testing. The results appear in Table 1.

The amount of stain blocker used were as follows, where % are by weight.

EXAMPLE # 1

4 g/L condensation product of this invention at 40% solid.

EXAMPLE # 2

4 g/L of a condensation product of a sulfonated dihydroxydiphenyl sulfone 40% solids.

EXAMPLE # 3

4 g/L of a condensation product of a sulfonated naphthalene and dihydroxydiphenyl sulfone 40% solids.

EXAMPLE # 4

4 g/L of a condensation product of a phenol sulphonic acid and a dihydroxydiphenyl sulfone 40% solids.

EXAMPLE # 5

4 g/L of a mixture of 50% by weight, of a condensation product of a sulfonated dihydroxydiphenyl sulfone, and 50% by weight of a condensation product of a sulfonated naphthalene and a dihydroxydiphenyl sulfone.

EXAMPLE # 6

6 g/L of a product made by adding 15% by weight of the product of this invention and 85% by weight of methacrylic acid copolymer of 20% solid and 40,000 M.N.

EXAMPLE # 7

6 g/L of a mixture of 15% of a sulfonated dihydroxydiphenyl sulfone condensate and 85% of a methacrylic acid copolymer as in Example 6 above.

EXAMPLE # 8

6 g/L of a mixture of 15% of a condensation product of a sulfonated naphthalene and a dihydroxydiphenyl sulfone and 85% of a methacrylic acid copolymer as in Example 6 above.

EXAMPLE # 9

6 g/L of a mixture of 15% of a dihydroxydiphenyl sulfone and a phenol sulphonic acid condensate and 85% of a methacrylic acid copolymer as in Example 6 above.

Test on Nylon 6

In each case Nylon 6 substrate was immersed in the stain resist bath to obtain a pick up of 350% by weight based on the weight of the substrate, then steamed for 3 minutes, followed by light rinsing and drying so as to be ready for testing dried to be ready for testing. The results appear in Table # 2:

EXAMPLE # 10

6 g/L of a condensation product of this invention at 40% solids.

EXAMPLE # 11

6 g/L of a condensation product of sulfonated dihydroxydiphenyl sulfone.

EXAMPLE # 12

6 g/L of a condensation product of a sulfonated naphthalene and a dihydroxydiphenyl sulfone at 40% solids.

EXAMPLE # 13

6 g/L of a condensation product of a phenol sulphonic acid and a dihydroxydiphenyl sulfone at 40% solids.

EXAMPLE # 14

6 g/L of the resin mixture of example # 5.

EXAMPLE # 15

10 g/L of a mixture of 15% of a condensation product of this invention and 85% of a methacrylic acid copolymer 20% solid and 40,000 MN.

EXAMPLE # 16

10 g/L of 15% condensation product of sulfonated dihydroxydiphenyl sulfone and 85% methacrylic acid copolymer as in Example 15 above.

EXAMPLE # 17

10 g/L of a mixture of 15% of a condensation product of naphthalene sulphonic acid and a dihydroxydiphenyl sulfone and 85% of a methacrylic acid copolymer as in Example 15 above.

EXAMPLE # 18

10 g/L of a mixture of 15% of a condensation product of phenol sulphonic acid and dihydroxydiphenyl sulfone and 85% of a methacrylic acid copolymer as in Example 15 above.

EXAMPLE # 19

6 g/l of a mixture of 40% of the condensation product of this invention neutralized by sodium hydroxide and 60% methacrylic acid polymer is applied on Nylon 6 as described in the test method with additional 5 g/l non-ionic fluorochemical has 9% fluorine content.

EXAMPLE # 20

6 g/l of a mixture of 40% of the condensation product of this invention neutralized by magnesium oxide and 60% methacrylic acid polymer is applied on nylon 6 as described in the test method with additional 5 g/l non-ionic fluorochemical has 9% fluorine content.

TABLE 1

|  | IS | WS | ID | LD |
|---|---|---|---|---|
| Example 1 | 8 | 7-8 | 4-5 | 4-5 |
| Example 2 | 8 | 7-8 | 3-4 | 3-4 |
| Example 3 | 7 | 6 | 4 | 4 |
| Example 4 | 7-8 | 6-7 | 3-4 | 3-4 |
| Example 5 | 8 | 7 | 3-4 | 3-4 |
| Example 6 | 9-10 | 7-8 | 5 | 5 |
| Example 7 | 9 | 7-8 | 4 | 4 |
| Example 8 | 7-8 | 6 | 4-5 | 4-5 |
| Example 9 | 7-8 | 6-7 | 4 | 4 |

TABLE 2

|  | IS | WS | ID | LD |
|---|---|---|---|---|
| Example 10 | 8-9 | 7-8 | 4-5 | 4-5 |
| Example 11 | 8-9 | 7-8 | 3-4 | 3-4 |
| Example 12 | 7 | 6 | 4-5 | 4-5 |
| Example 13 | 7 | 6-7 | 3-4 | 3 |
| Example 14 | 8 | 7 | 3-4 | 3-4 |
| Example 15 | 9-10 | 8 | 5 | 5 |
| Example 16 | 9 | 7-8 | 3-4 | 3-4 |
| Example 17 | 7-8 | 6 | 4-5 | 4-5 |
| Example 18 | 8 | 6-7 | 3-4 | 3-4 |

TABLE 3

|  | IS | WS | ID | LD | Water repellency | Oil repellency |
|---|---|---|---|---|---|---|
| Example 19 | 8-9 | 7-8 | 4-5 | 4-5 | 3 | 3-4 |
| Example 20 | 9-10 | 8 | 4-5 | 4-5 | 4-5 | 4-5 |

Results

1) The results in Table 1 of the treatment of stain blocker on nylon 66 show the following:
   a. Best results of anti-stain and wash durability provided by products of examples # 1, 2, 6 and 7.
   b. Best light fastness and non-yellowing were provided by products of examples # 1, 6 and 8.
2) The results of table 2 of the treatment of stain blocker on nylon 6 shows the following:
   c. Best results of anti-stain and wash durability were provided by products of examples # 10, 11, 15 and 16.
3) It is clear that the lowest yellowing on carpet and the best light fastness are for the carpets treated with the product of this invention.
4) It was noticed that the product of example 5 and 14 which contains a mixture of:
   a. Condensation product of sulfonated dihydroxydiphenyl sulfone and:

b. Condensation product of sulfonated naphthalene and dihydroxydiphenyl sulfone did not perform as well as the condensation resins of this invention, in the staining or the yellowing.

5) The second best product for the non-yellowing and light fastness is the one containing sulfonated naphthalene, dihydroxydiphenyl sulfone and formaldehyde.

However, the product of this invention is superior in initial staining and the wash durability and has equal or superior light fastness and non yellowing.

6) It was noticed that when the resin of this invention neutralized with magnesium oxide, it improved the initial staining and wash durability. Also, when a fluorochemical is presented in the bath the resin neutralized with magnesium oxide shows a better exhaustion of the fluorochemical on the polyamide fibers.

While the invention has been particularly described by reference to a fibrous polyamide substrate, it applied equally to a wool substrate for the application of the condensation products.

It will be recognized that various modifications and alterations of the invention will be apparent to those skilled in the art without department from the scope and spirit of the invention and that the invention is not restricted by the details and examples set forth for illustrative purposes.

The invention claimed is:

1. A fibrous polyamide or wool substrate having resistance to staining by acid colorants comprising: a fibrous polyamide or wool substrate having applied thereto a sulfonated aromatic condensation resin, said resin being a condensation product of: i) a sulfonated, dihydroxydiphenyl sulfone; ii) a dihydroxydiphenyl sulfone; iii) a sulfonated naphthalene and iv) an aldehyde.

2. A substrate according to claim 1, further having applied thereto a methacrylic acid polymer or copolymer.

3. A substrate according to claim 1, wherein said aldehyde is formaldehyde.

4. A substrate according to claim 2, wherein said methacrylic acid polymer is a homopolymer or copolymer having a weight average molecular weight of 50,000 to 500,000 and number average molecular weight of 25,000 to 150,000.

5. A substrate according to claim 1, further having applied thereto an anionic or non-ionic fluorochemical.

6. A substrate according to claim 5, further having applied thereto a salt effective to improve exhaustion of the resin on the substrate.

7. A substrate according to claim 1, wherein the degree of sulfonation of the sulfonated naphthalene and the sulfonated dihydroxydiphenyl sulfone is between 30 to 200%.

8. A substrate according to claim 1, wherein the condensation product is a neutralized condensation product.

9. A substrate according to claim 8, wherein the condensation product is neutralized with caustic soda, potassium hydroxide, aluminum hydroxide, barium hydroxide, barium oxide, magnesium oxide, zinc oxide, aqueous ammonia or alumina trihydrate to form a condensated aromatic neutralized resin, water soluble at pH 1-10.

10. A substrate according to claim 8 wherein the condensation product is neutralized with a metal oxide or hydroxide, and further having applied thereto an anionic or non-ionic fluorochemical, and wherein the resin and the fluorochemical are applied from a bath and addition of salt is not required.

11. A substrate according to claim 5, wherein the condensation product is a neutralized condensation product, said condensation product having been neutralized with a metal oxide, said condensation product and fluorochemical having been exhausted from a bath free of salt for the exhaustion.

12. A substrate according to claim 11, further having applied thereto, from the bath free of salt for the exhaustion, a methacrylic acid polymer or copolymor.

13. A substrate according to claim 12, wherein said methacrylic acid polymer is a hornopolymer or copolymer having a weight average molecular weight of 50,000 to 500,000 and number average molecular weight of 25,000 to 150,000.

14. A substrate according to claim 9, wherein said condensated aromatic neutralized resin is water soluble at pH 3-7.

15. A substrate according to claim 9, wherein said condensated aromatic neutralized resin is water soluble at pH 3-5.

16. A substrate according to claim 11, wherein said metal oxide is magnesium oxide.

17. A substrate according to claim 12, wherein said metal oxide is magnesium oxide.

18. A substrate according to claim 13, wherein said metal oxide is magnesium oxide.

* * * * *